United States Patent [19]

Fisher

[11] 4,075,916
[45] Feb. 28, 1978

[54] PIPE CUT OFF SAW
[75] Inventor: Roy Jack Fisher, Dallas, Tex.
[73] Assignee: Nipak, Inc., Dallas, Tex.
[21] Appl. No.: 688,758
[22] Filed: May 21, 1976
[51] Int. Cl.² .................................... B23D 45/12
[52] U.S. Cl. ............................... 82/78; 82/83; 82/100; 82/101; 83/490; 83/581
[58] Field of Search ............ 82/70.2, 72, 73, 74, 82/75, 76, 77, 78, 83, 100, 101; 83/490, 581; 269/56; 266/54–57; 33/21 C

[56] References Cited

U.S. PATENT DOCUMENTS

| | | | |
|---|---|---|---|
| 1,780,009 | 10/1930 | Fantz | 266/56 |
| 1,858,076 | 5/1932 | Douglas | 33/21 C |
| 1,861,923 | 6/1932 | Jones et al. | 266/56 |
| 2,623,285 | 12/1952 | Marinovich | 266/54 X |
| 2,623,742 | 12/1952 | Livesay | 266/56 |
| 3,262,689 | 7/1966 | Eller | 266/56 |

FOREIGN PATENT DOCUMENTS

| | | | |
|---|---|---|---|
| 927,788 | 5/1955 | Germany | 266/56 |
| 976,651 | 12/1964 | United Kingdom | 83/490 |

Primary Examiner—J. M. Meister
Attorney, Agent, or Firm—Howard E. Moore; Gerald G. Crutsinger; Larry B. Dwight

[57] ABSTRACT

A pipe cut off saw comprising a pipe cradle and a cutting means pivotally secured adjacent said pipe cradle such that the pivot point is aligned with the center line of the pipe so that the cutting means may be rotated about the pipe to cut off the end of the pipe. The pipe cradle has elevating apparatus to change the angle of the center line relative to the pivot point of the saw to permit miter cuts on the pipe.

8 Claims, 5 Drawing Figures

PIPE CUT OFF SAW

BACKGROUND OF THE INVENTION

Large diameter pipes are fabricated for use on various construction projects such as conduits, sewers, crawl spaces, ducts, etc. Because of the large diameter of the pipe, being cut from 12 to 48 inches, it is very difficult to cut the pipe square or achieve a miter cut for an angular joint.

Heretofore, apparatus to cut such a large diameter pipe did not allow for angular cuts and usually used a fixed cutting means and the pipe was rotated about the cutting means to cut same.

In order to rotate such a heavy pipe, rotation apparatus was necessary, making the pipe cutting apparatus more complicated and expensive to construct and maintain.

SUMMARY

I have devised a pipe cutting apparatus comprising a cutter such as a saw which is adjustably secured to vertical supports extending outwardly and being rigidly secured to a shaft rotatably secured to pillow blocks on an adjustable table. The saw heighth relative to the centerline of the pipe may be adjusted to compensate for the different diameters of pipes. The shaft is rotatably secured in the pillow blocks on the adjusting table and may be adjusted relative to the center line of pipe being cut such that the axes of the shaft and the pipe's center line are aligned.

A pipe cradle is formed from structural members which supports the pipe in a horizontal position. The cradle consists of a V-shaped holding member such that different diameter pipes may be readily placed on the cradle without adjustment.

One of the pipe holding members of the pipe cradle is adjustable vertically such that the axes of the pipe may be titled relative to the horizontal position for allowing miter cuts of pipe positioned therein.

Upon placing a pipe in the cradle, the axes of the rotating shaft of the saw is aligned with the center line of the pipe and the saw is adjusted to engage the outer circumference of the pipe. A handle secured to the shaft is then rotated, moving the shaft which arcuately rotates the saw about the exterior circumference of the pipe. Depending upon the wall thickness of the pipe, it may be necessary to make more than one rotation, cutting deeper into the pipe each turn.

A primary object of the invention is to provide an apparatus which will readily cut square and miter cuts on the ends of large diameter pipes without the necessity of turning the pipe against the saw.

A further object of the invention is to provide such apparatus in which the cutting device is controlled by movement of the user to prevent binding of the saw under the heavy load of large diameter pipe.

A further object of the invention is to provide a pipe cutting apparatus which is readily adjustable to accommodate different diameters of pipe, minimizing the amount of time which is necessary to adjust to different diameter pipes.

A still further object of the invention is to provide an apparatus which will readily cut miters on the ends of pipe to allow for angular joining to an adjacent pipe.

Other and further objects of the invention will become apparent upon reading the following detailed description and by referring to the drawings annexed hereto.

DESCRIPTION OF THE DRAWINGS

Drawings of a preferred embodiment of the invention are annexed hereto so that the invention may be better and more fully understood, in which.

Numeral references are used to designate the various parts shown in the drawings and like numerals are used to designate like parts throughout the various figures of the drawings.

DESCRIPTION OF A PREFERRED EMBODIMENT

Figure 1:
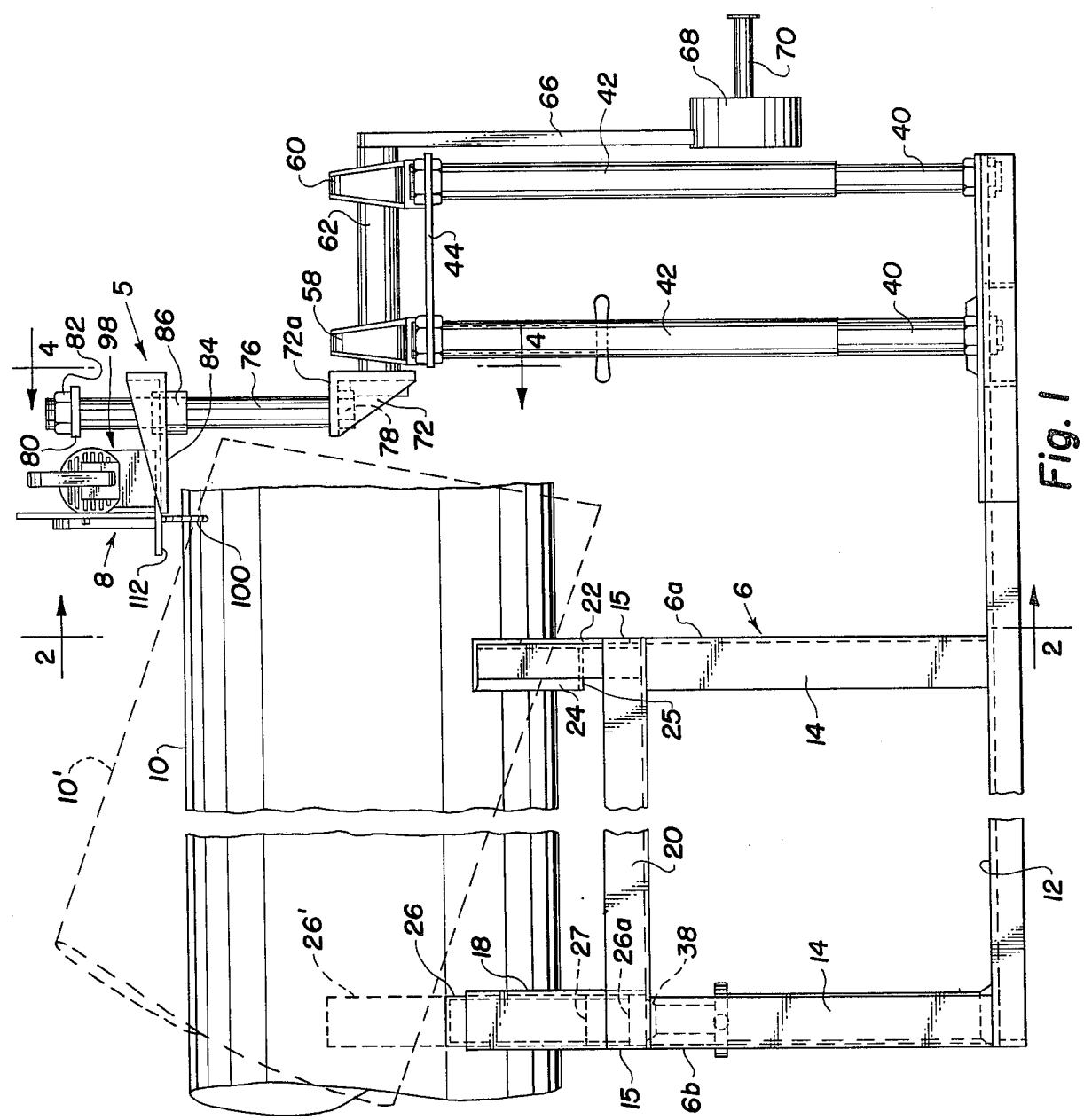
FIG. 1 is a fragmented side elevational view illustrating the pipe cradle and cutting device.

Referring to FIG. 1 of the drawings, the numeral 5 generally designates the pipe cutoff apparatus comprising a pipe cradle 6 and cutting support means 8. A pipe 10 is positioned in the pipe cradle 6 where a square or miter cut may be made by the cutting means 8 as will be more fully explained hereinafter.

The cradle 6 and cutting support means 8 are secured to a base 12 comprised of channel irons welded or otherwise secured together to form a rectangularly shaped base.

Angle irons 14 extend upwardly from base 12 and are welded or otherwise secured thereto. The angle irons 14 are welded or otherwise secured to cross members 15 which extend outwardly from the sides of pipe cradle 6. Brace members 20 extend along each side of pipe cradle 6, and are secured to cross member 15 to form a rectangular frame.

Angles 22 extend upwardly from cross member 15 on end 6a of pipe cradle 6 and are secured to angularly disposed members 24. Angularly disposed members are secured at one end to vertical members 22 and at the opposite end are secured together at vertex 25 to form a V-shaped pipe holding member 24.

At end 6b of pipe cradle 6 means to adjust the angle of the pipe 10 comprises upwardly extending channel irons 16 and 18 welded or otherwise secured to cross member 15. A second V-shaped pipe holding member 26 is constructed of sheet steel or angle irons to form a triangularly shaped notch having an apex 27 centrally located in the pipe cradle 6 aligned with vertex 25 of pipe holding member 24.

The V-shaped pipe holding member 26 is slideably disposed in the channels 16' and 18' formed in channel irons 16 and 18. Means to adjust the heighth of adjustable pipe holding member 26 comprises a column 28 welded or otherwise secured to a base 30 which is welded or otherwise secured to base 12. A screw 32 is threadedly secured to an internally threaded collar 34 having handles 36 thereon. The screw 32 is secured to retaining block 38 welded or otherwise secured to the base 26a of adjustable pipe holding member 26. It should be readily apparent that rotation of threaded collar 34 by handles 36 moves the screw 32 into or out of column 28 to adjust the heighth of adjustable pipe holding member 26.

Figure 3:
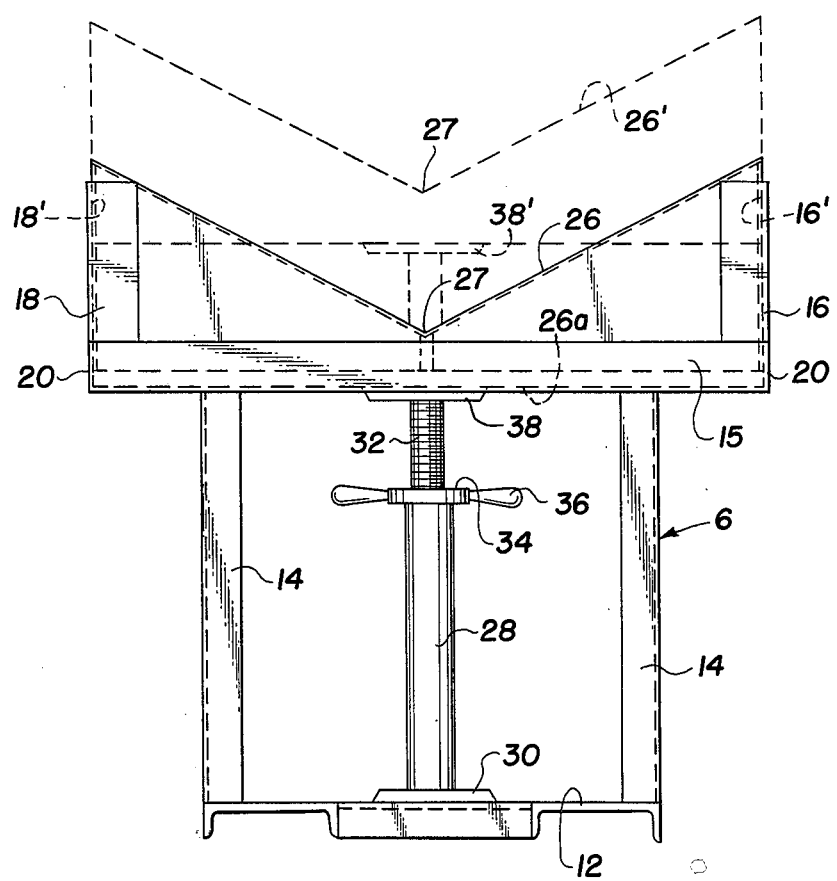
FIG. 3 is an end elevational view of the pipe cradle with the cutting apparatus removed to more clearly illustrate the device.
Figure 5:
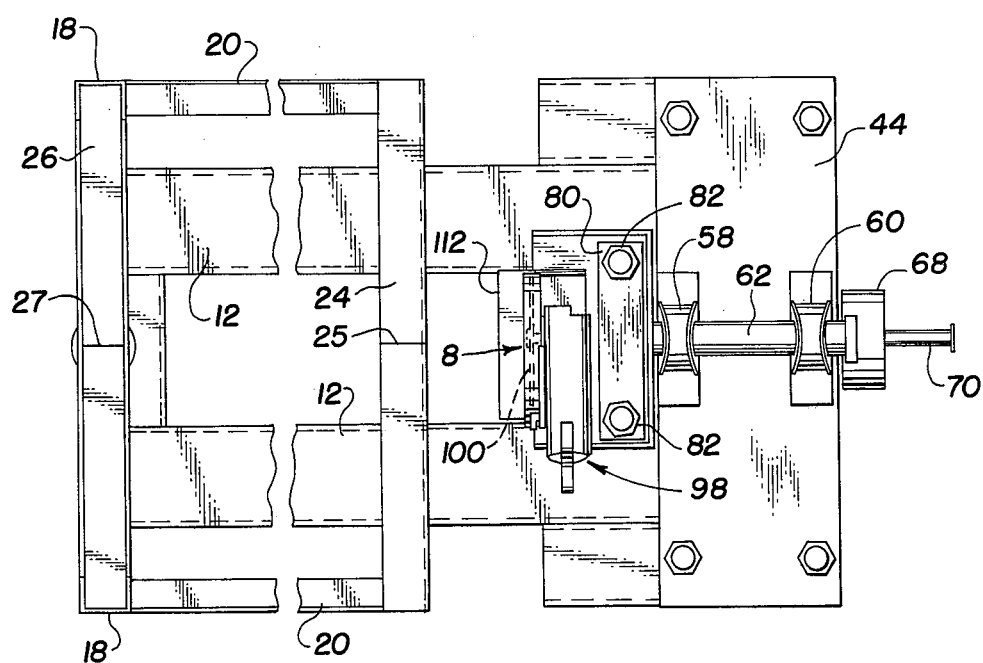
FIG. 5 is a top plan view with the pipe removed.

When adjustable pipe holding member 26 is in the position shown in full outline in FIGS. 1 and 3, the center line of the pipe 10 is horizontal. Elevation of adjustable pipe holding member 26 pivots the front portion of pipe 10 on fixed pipe holding member 24 and tilts the center line of pipe 10 relative to the horizontal plane to allow a miter cut on the pipe 10 as shown in dashed outline 10'.

Figures 2, 4:
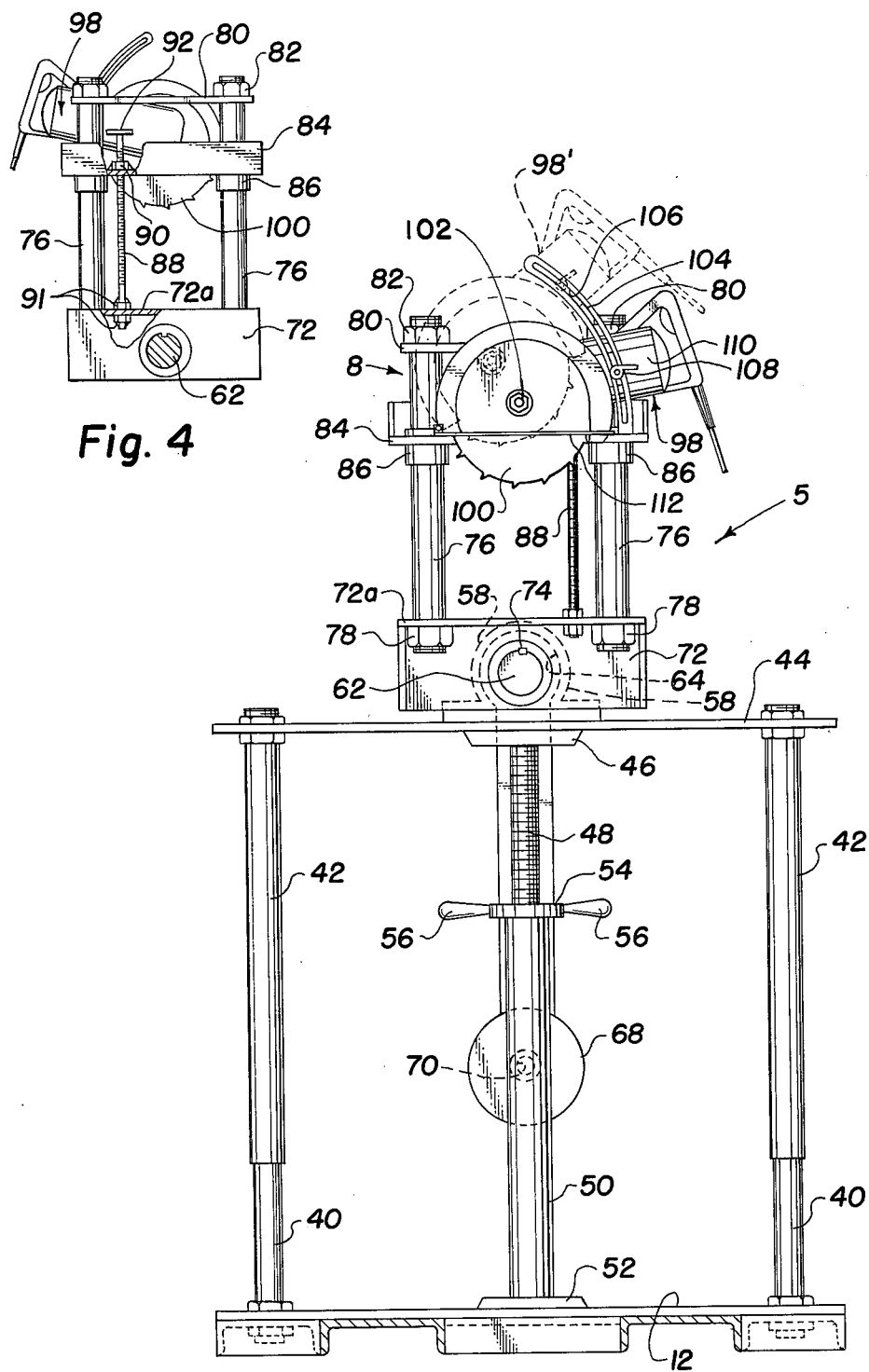
FIG. 2 is a cross sectional view taken along line 2—2 of FIG. 1.
FIG. 4 is an end cross sectional view taken along line 4—4 of FIG. 1.

As best illustrated in FIGS. 1 and 2, the cutting means 8 comprises upwardly extending tubular members 40 bolted or otherwise secured to base 12. Upwardly extending tubular members 40 are telescopically disposed in downwardly extending tubular members 42 which are bolted or otherwise secured to a horizontally positioned plate 44. The relative heighth of plate 44 is controlled by an adjusting means comprising a collar 46 welded or otherwise secured to plate 44. Threaded tubular member 48, welded or otherwise secured to collar 46, extends downwardly through column 50, which is welded or otherwise secured to base 52 secured to base 12. An internally threaded collar 54, having handles 56 thereon, is rotatably positioned on the upper end of column 50 and has threaded tubular member 48 extending downwardly therethrough such that rotation of collar 54 changes the elevation of threaded member 48 to adjust the elevation of plate 44 relative to base 12. Pillow blocks 58 and 60 are welded or otherwise secured to the central portion of plate 44. A shaft 62 is rotatably disposed in bearings 64 positioned in the pillow blocks 58 and 60.

The center line of shaft 62 is centrally positioned such that the axis of shaft 62 may be aligned with the center line of pipe 19 by adjustment of the relative heighth of plate 44. The V-shape of pipe holding members 24 and 26 maintains the center line of pipe 10 in a vertical plane passing through the apex of the V-shaped notches in members 24 and 26. Regardless of the diameter of pipe 10 the center line of shaft 62 is vertically aligned with the center line of pipe 10 and the apex of the V-shaped notch formed of pipe holding members 24 and 26.

A lever arm 66 is welded or otherwise secured to one end of shaft 62. A counterweight 68 is rigidly secured to the end of lever arm 66 to maintain the lever arm 66 in the vertical position when not in use. A handle 70 is positioned on counterweight 68 to provide gripping means for rotation of lever arm 66 to rotate shaft 62.

An angular support member, or gusset, 72 is secured to the opposite end of shaft 62 and maintained there by key 74. The upper flange 72a of support member 72 has upwardly extending tubular columns 76 secured thereto by bolts 78 or the like. Upwardly extending vertical members 76 are spaced apart by a brace member 80 bolted or otherwise secured thereto by nuts 82.

A saw support platform 84 has sleeves 86 welded or otherwise secured through passages formed in the platform 84. Platform 84 and sleeves 86 are slidably disposed on upwardly extending vertical members 76. A heighth adjusting screw 88 is threadedly secured to a nut 90 welded or otherwise secured to platform 84 and member 72 by nuts 91 such that rotation of the screw 88 by handle 92 allows for movement of the heighth of saw platform 84 relative to the center line of pipe 10. Saw platform 84 is adapted to move in an arcuate plane about the circumference of the pipe 10.

A cutting means such as worm gear saw 98 manufactured by Skil Corporation is bolted or otherwise secured to saw support platform 84 and is connected to a suitable source of power such as 110 volts AC. A blade 100 suitable for cutting the material of which the pipe is constructed is secured to saw 98 by nut 102.

Saw 98 has a heighth adjustment means comprising a lever bar 104 having a slot 106 formed therein through which a threaded nut 108 having a shaft thereon passes, and is connected to the body 110 of saw 98. The body 110 of saw 98 is moveable relative to the saw guard 112 to adjust the depth of cutting from blade 100 from a position shown in full outline to a position 98' shown in dashed outline. The heighth adjustment makes it possible to adjust the depth of cut necessary to cut the pipe 10, depending upon the material used to construct the pipe. The saw blade 100 may cut completely through the wall of the pipe 10 or it may be adjusted to cut a given depth each revolution around the pipe 10.

Operation of the hereinbefore described device is as follows:

A pipe 10 of varied diameter may be placed on the pipe cradle in which the center line is aligned with a given vertical plane automatically because of the V-shaped notches in the pipe holding members 24 and 26. For a square cut the position of pipe 10 is horizontal and the axis thereof is perpendicular to the blade 100 of saw 98. The center line of shaft 62 is then adjusted by rotation of collar 54 by handles 56 so that it is aligned with center line of pipe 10.

If preferred, indicia may be placed on upwardly extending tubular support members 40 indicating the diameter of the pipe 10 to facilitate alignment of the axis of shaft 62 with the axis of pipe 10.

The relative heighth of saw platform 84 is then adjusted to engage the teeth of blade 100 on saw 98 with the outer circumference of pipe 10 by rotation of screw 88.

Depending upon the type of material of pipe 10, the saw 98 is then switched on and the blade heighth adjusted to cut into pipe 10 by loosening wing nut 108. Handle 70 is grasped firmly and rotated such that lever arms 66 rotates shaft 62 which moves saw 98 arcuately relative to the circumference of the pipe 10. The process is repeated until the pipe is cut through taking as deep a cut as would be indicated by the material of the pipe as will be apparent to those skilled in the art.

A miter cut is accomplished by elevating adjustable pipe holding member 26 to a position shown in dashed outline 26' tilting the center line of the pipe 10 such that pipe 10 is elevated to position 10' shown in dashed outline. This is accomplished by rotation of collar 34 by handles 36 to move the heighth of screw 32 relative to column 28.

Indicia may be placed upon the side of adjustable pipe holding member 26 such that movement of adjustable pipe holding member 26 relative to the end of channel 18 would indicate the angle of pipe 10.

The pipe is then cut, as heretofore described, by rotation of handle 70 to rotate shaft 62 and saw 98 about the circumference of the pipe 10' thereby cutting the pipe on the angle.

From the foregoing it should be readily apparent that the embodiment hereinbefore described accomplishes the objects of the invention hereinbefore discussed.

It should be appreciated that other and further embodiments of the invention may be devised without departing from the spirit and scope of the appended claims.

Having described my invention, I claim:

1. In a pipe cutting device: a base; spaced pipe supports mounted on the base; means to adjust the height of one of the supports to tilt a pipe carried in the supports; a saw; means for supporting the saw in a position to engage and cut a pipe disposed on the supports; means to move the saw in an arcuate plane about a pipe disposed on the support; and means to adjust the height of the saw support comprising means slidably mounting the support relative to the base; a threaded shaft having an upper end secured to the support; a sleeve attached to the base with the lower end of the shaft extending into the sleeve; and a collar threadedly engaged with the shaft resting on the upper end of the sleeve whereby when the collar is rotated the shaft is caused to move into and out of the sleeve to adjust the height of the support.

2. The combination called for in claim 1 wherein the means to move the saw in an arcuate plane comprises: a crank rotatably carried on the pipe supports and operably connected to the saw to rotate same.

3. The combination called for in claim 1 wherein the pipe supports have V-shaped upper surfaces to receive the pipe.

4. A pipe cutting apparatus comprising: first and second pipe holding members; a base; means to rigidly secure the first pipe holding member to the base; means to secure the second pipe holding member to said base in horizontally spaced relationship to the first pipe holding member; means to adjust the heighth of the second pipe holding member relative to the base; cutter support means comprising upwardly extending legs secured to the base; a plate; downwardly extending legs secured to said plate in spaced relation, said downwardly extending legs being telescopically disposed over the said upwardly extending legs; means to telescopically adjust the legs to adjust the height of said plate relative to the base; means to secure said cutter support means to said base in spaced horizontal relationship to said pipe holding members; a shaft; means for rotatably securing said shaft to said cutter support means; a crank arm secured to one end of said shaft; upwardly extending support means rigidly secured to the other end of said shaft; a saw support bracket; means to secure said saw support bracket to said upwardly extending support member; and a saw rotatably secured to said saw support bracket such that rotation of said crank arm moves the saw support bracket and the saw carried thereby about the outer circumference of a pipe supported in said pipe holding members to cut said pipe.

5. The combination called for in claim 4 wherein the means to adjust the height of the plate comprises: an upwardly extending hollow standard; means securing said standard to said base; a threaded shaft secured to said plate, said threaded shaft extending into said standard; and a collar threadedly secured to said threaded shaft and positioned against the upper end of the standard such that rotation of the collar against the upper end of the standard moves the threaded shaft into and out of the standard.

6. In a pipe cutting device; a base; spaced pipe supports mounted on the base; means to adjust the height of one of the supports to tilt a pipe carried in the supports; a saw; means for supporting the saw in a position to engage and cut a pipe disposed on the supports; means to move the saw in an arcuate plane about a pipe disposed on the supports; and means to adjust the vertical position of the saw support comprising first telescoped legs; means to move the first telescoped legs relative to each other; a platform on which the saw is mounted; second telscoped legs between the platform and the mounting; and means to move the second telescoped legs to adjust the height of the platform.

7. The combination called for in claim 6 wherein the means to move the first and second telescoped legs relative to each other are take up screws disposed therebetween.

8. A cutting apparatus comprising: support means; a shaft; means rotatably securing said shaft to said support means; an arm; means securing an end of said arm to said shaft; a saw motor; saw motor support means secured to said arm; cutting means secured to said saw motor; means to move said saw motor support means longitudinally of said arm; means pivotally securing said motor to said saw motor support means; and means secured to said shaft to rotate said shaft such that the saw motor and cutting means moves along an arcuate path about the axis of said shaft.

* * * * *